July 20, 1954 F. E. HAWLEY 2,684,260
SILENCER FOR STEERING MECHANISM
Filed July 17, 1952
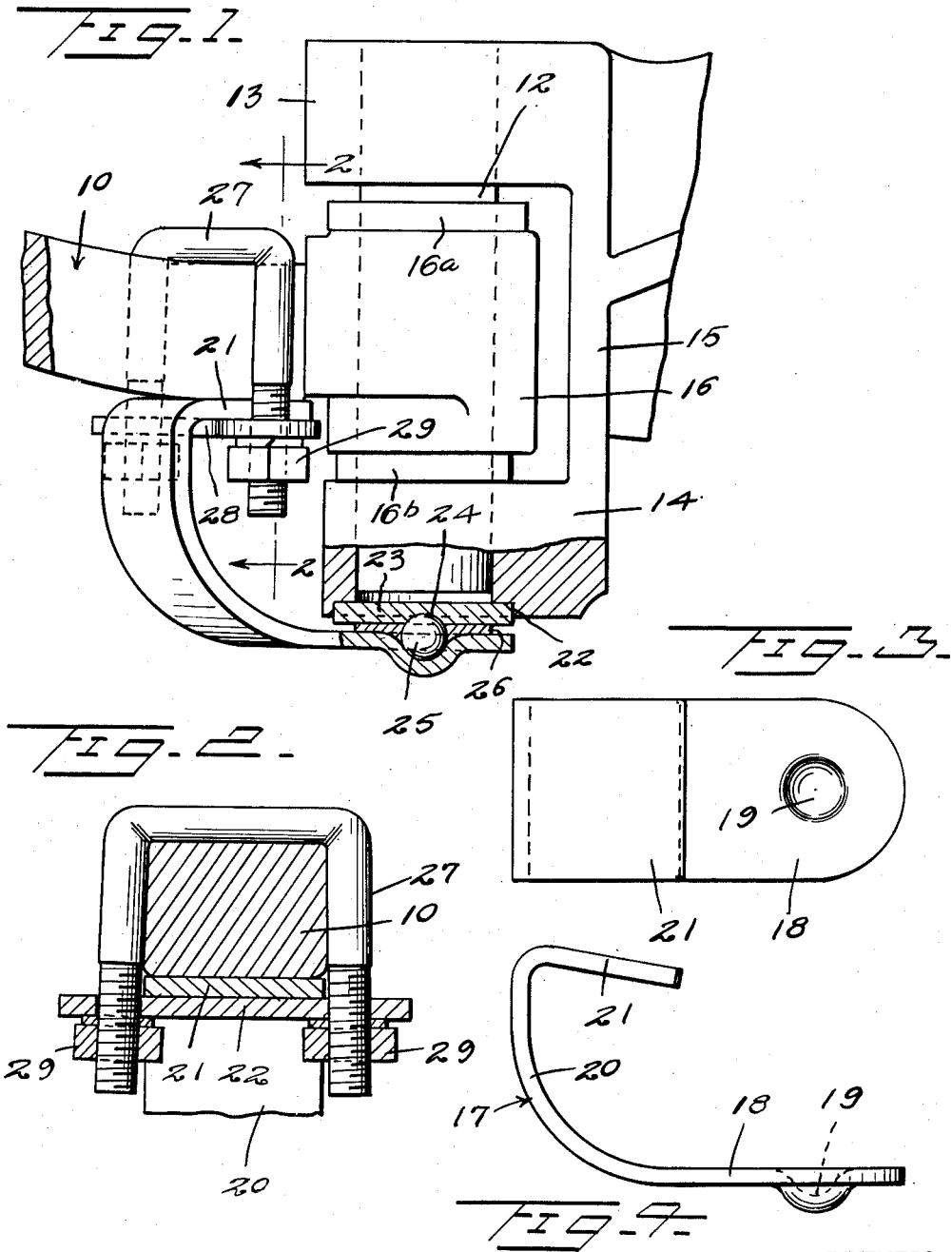
INVENTOR
Floyd E. Hawley
BY Kimmel & Crowell
ATTORNEYS Patented July 20, 1954

2,684,260

UNITED STATES PATENT OFFICE 2,684,260

SILENCER FOR STEERING MECHANISM

Floyd E. Hawley, Pelham, Ga.

Application July 17, 1952, Serial No. 299,361

3 Claims. (Cl. 287—100)

This invention relates to vehicle steering mechanism, and more particularly to a means to prevent vibration and rattle of the mechanism.

In certain types of motor vehicles there is provided means in the form of an auxiliary lever with a mounting therefor which is connected with the chassis for automatically returning the steering or front wheels to a straight line position. The connection between the lever mounting and the lever is such that considerable rattle arises from the end play of the lever. It is, therefore, an object of this invention to provide a means whereby noise between the lever and mounting will be eliminated.

Another object of this invention is to provide a device of this kind which can be easily and quickly mounted.

With the above and other objects in view, my invention consists in the arrangement, combination and details of construction disclosed in the drawing and specification, and then more particularly pointed out in the appended claims.

In the drawing:

Figure 1 is a fragmentary side elevation of a steering lever and mounting therefor having secured thereto a silencer constructed according to an embodiment of this invention, Figure 2 is a sectional view taken on the line 2—2 of Figure 1, Figure 3 is a plan view of the silencing spring, Figure 4 is a detail side elevation of the spring.

Referring to the drawing, the numeral 10 designates generally a lever associated with a conventional steering mechanism which is rockably mounted on a vertically disposed pivot 12 which is secured in a pair of spaced bosses 13 and 14, the bosses 13 and 14 being secured together by means of a webbing 15. A bushing 16 having upper and lower circular portions 16a and 16b is adapted to be positioned between bosses 13 and 14.

In order to provide a means whereby the bushing 16 which is carried by the inner end of the lever 10 and through which the pin 12 engages will be held in constant contact with the lower boss 14, I have provided a flat spring generally designated as 17. The spring 17 is formed with a horizontal lower straight portion 18 having a ball socket 19 formed therein and the straight lower portion 18 merges into an upwardly curved intermediate portion 20. The upper end of the spring 17 is bent reversely and inwardly and downwardly as indicated at 21.

The lower end of the boss 14 is formed with a socket or recess 22 within which a thrust washer or plate 23 is mounted. The washer or plate 23 is formed in the center thereof with a recess 24 within which a ball 25 carried by the socket 19 is adapted to engage. A felt or fibrous washer 26 is interposed between the straight portion 18 of spring 17 and the lower side of washer or plate 23. The felt washer 26 may be impregnated with a lubricant so that this washer will not only prevent dirt or foreign matter from coming into contact with the ball 25, but will also lubricate the ball 25.

An inverted U-shaped clamping bolt 27 extends over the inner end portion of the lever 10 and extends through a lower clamping plate 28. The clamping plate 28 bears against the lower side of the upper spring portion 21 so that when the nuts 29 threaded onto the two arms of the bolt 27 are tightened, the upper spring tensioning end 21 of spring 17 will be drawn tight against the lever 10 in order that the lower straight portion 18 of the spring 17 will be pressed against the ball 25. The tensioning of the spring 17 will provide for downward pull on the bushing 16 so that bushing 16 will be held in constant contact with the upper end of the bearing boss 14.

With a silencing means as hereinbefore set forth, the steering arm or lever will be held against vibration while permitting free rotary swinging movement in the steering of the wheels of a vehicle.

I do not mean to confine myself to the exact details of construction herein disclosed, but claim all variations falling within the purview of the appended claims.

What I claim is:

1. In a steering mechanism in combination a swingable lever having a bearing bushing at its inner end, spaced upper and lower bearing bosses with a pin extending through said bosses and bushing, means for holding said bushing against endwise movement, said means comprising a longitudinally bent flat spring located at one end thereof beneath and adjacent a lower boss, the opposite end of said spring extending upwardly toward said lever, a ball socket carried by said one end of said spring, a thrust plate bearing against said lower boss, a ball in said socket engaging against said plate, a reversely bent upper end carried by said spring, and clamping means engaging about said lever and beneath said upper end of said spring whereby to place the lower end of said spring under tension and thereby resiliently hold said bushing against the upper end of said lower boss.

2. A silencing means for a lever and a mounting therefor, comprising a flat resilient member formed with a relatively straight horizontal lower portion, an upwardly curved intermediate portion and a downwardly and inwardly inclined upper portion, a ball seat carried by said lower portion, a thrust plate engageable with the lower end of said mounting, a ball in said seat engaging against said plate, and clamping means engaging said upper portion of said member and engageable about said lever for tensioning said lower portion of said member and thereby drawing said lever downwardly into contact with said mounting.

3. A silencing means for a lever and a mounting therefor, comprising a flat resilient member formed with a relatively straight horizontal lower portion, an upwardly curved intermediate portion and a downwardly and inwardly inclined upper portion, a ball seat carried by said lower portion, a thrust plate engageable with the lower end of said mounting, a ball in said seat engaging against said plate, a fibrous sealing and lubricating washer interposed between said plate and said member, and clamping means engaging said upper portion of said member and engageable about said lever for tensioning said lower portion of said member and thereby drawing said lever downwardly into contact with said mounting.

References Cited in the file of this patent

UNITED STATES PATENTS

| Number | Name | Date |
|---|---|---|
| 1,509,031 | Sandstrom | Sept. 16, 1924 |

FOREIGN PATENTS

| Number | Country | Date |
|---|---|---|
| 620,306 | France | Jan. 17, 1927 |
| 815,154 | Germany | Sept. 27, 1951 |
| 828,064 | Germany | Jan. 14, 1952 |